US011453183B2

(12) United States Patent
Suselbeek et al.

(10) Patent No.: US 11,453,183 B2
(45) Date of Patent: Sep. 27, 2022

(54) WIND TURBINE BLADE MANUFACTURE

(71) Applicant: Vestas Wind Systems A/S, Aarhus N. (DK)

(72) Inventors: Edgar Suselbeek, Meppel (NL); Bo Vermund Heinrich Jensen, Nakskov (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/415,792

(22) PCT Filed: Dec. 20, 2019

(86) PCT No.: PCT/EP2019/086609
§ 371 (c)(1),
(2) Date: Jun. 18, 2021

(87) PCT Pub. No.: WO2020/127926
PCT Pub. Date: Jun. 25, 2020

(65) Prior Publication Data
US 2022/0055323 A1    Feb. 24, 2022

(30) Foreign Application Priority Data
Dec. 20, 2018   (EP) .................................... 18214481

(51) Int. Cl.
*B29C 70/86*   (2006.01)
*B29C 70/44*   (2006.01)
(Continued)

(52) U.S. Cl.
CPC ............ *B29C 70/86* (2013.01); *B29C 70/443* (2013.01); *B29C 70/48* (2013.01);
(Continued)

(58) Field of Classification Search
CPC ....... B29C 70/86; B29C 70/443; B29C 70/48; B29C 33/126; B29C 70/44;
(Continued)

(56) References Cited

U.S. PATENT DOCUMENTS 9,180,630 B2 *  11/2015  Madsen ................. B29C 70/48
9,878,504 B2 *  1/2018   Madsen ................. F03D 1/065
(Continued)

FOREIGN PATENT DOCUMENTS

EP    2401497 A1   1/2012
EP    2589796 A1   5/2013
ES    2382245 A1   6/2012

OTHER PUBLICATIONS

European Patent Office, Search Report in EP Application No. 18214481.6, dated Sep. 6, 2019.
(Continued)

*Primary Examiner* — Ryan J. Walters
(74) *Attorney, Agent, or Firm* — Wood Herron & Evans LLP (57) ABSTRACT

A method of making a prefabricated root section (26) for a wind turbine blade (10) is described. The method comprises: providing a male mould (28) extending longitudinally in a spanwise direction between an inboard end (30) and an outboard end (32) and extending transversely in a chordwise direction between a leading edge (34) and a trailing edge (36), the male mould (28) defining a male mould surface (38) of convex curvature in the chordwise direction; providing a root plate (48) having one or more root inserts (50) projecting therefrom, the or each root insert (50) being arranged along an arcuate path; arranging one or more inner fibrous layers (40) on the male mould surface (38); arranging the root plate (48) at the inboard end (30), of the male mould (28) such that the or each root insert (50) overlays an inner fibrous layer at the root end of the mould (28). The
(Continued)

method further comprises arranging one or more outer fibrous layers on top of the inner fibrous layers (40) and on top of the or each root insert (50), providing resin to the fibrous layers (40) and to the or each root insert (50) and curing the resin to form a prefabricated root section (26) for subsequent use in the manufacture of a wind turbine blade (10). Curing the resin to form the prefabricated root section (26) is conducted before removing the prefabricated root section (26) from the male mould (28).

11 Claims, 10 Drawing Sheets

(51) Int. Cl.
  *B29C 70/48* (2006.01)
  *B29D 99/00* (2010.01)
  *B29K 705/12* (2006.01)
  *B29L 31/08* (2006.01)

(52) U.S. Cl.
  CPC ...... *B29D 99/0028* (2013.01); *B29K 2705/12* (2013.01); *B29L 2031/085* (2013.01)

(58) Field of Classification Search
  CPC ............ B29D 99/0028; B29K 2705/12; B29K 2705/00; B29L 2031/085; Y02E 10/72; Y02P 70/50; F03D 1/0658
  See application file for complete search history.

(56) References Cited

U.S. PATENT DOCUMENTS

| | | | |
|---|---|---|---|
| 10,190,571 B2 * | 1/2019 | Samudrala | ............ F03D 1/0658 |
| 2007/0251090 A1 | 11/2007 | Breugel et al. | |
| 2011/0308703 A1 * | 12/2011 | Ossanai | .................. F03D 1/065 156/93 |
| 2017/0002660 A1 | 1/2017 | Samudrala et al. | |

OTHER PUBLICATIONS

European Patent Office, International Search Report and Written Opinion in PCT Application No. PCT/EP2019/086609, dated Jun. 17, 2020.

* cited by examiner

WIND TURBINE BLADE MANUFACTURE

TECHNICAL FIELD

The present invention relates generally to the manufacture of wind turbine blades.

BACKGROUND

The blades of modern utility-scale wind turbines generally comprise a hollow blade shell formed of composite materials, such as glass-fibre reinforced plastic. The blade shell is typically formed of windward and leeward half shells, which are manufactured in respective female half moulds of a blade mould assembly. The root end of the blade shell is typically significantly thicker than the remainder of the shell in order to support the static and dynamic loads of the blade in use.

In existing blade manufacturing techniques, the increased shell thickness at the root end is achieved by building up a large number of glass-fibre layers at the root ends of the half moulds. However, it is time consuming to lay up such a large number of layers. The process is made more complicated by the steep sides of the mould at the root end, as it can be difficult to secure the fabric layers in place without slippage. Consequently, the laminate layers at the root end are prone to creasing and wrinkling, which may compromise the structure of the blade. Aside from the layup time, a significant amount of time is also required to cure the resin in these thick root laminates. These aspects of the blade production process therefore contribute significantly to the overall time required to make the blade.

The moulds of modern wind turbine blades are expensive to produce, since they are very large structures, typically in excess of fifty metres in length, and usually include integral heating systems and sensor systems, which are utilised during curing of the blade shell laminates. In addition to being expensive, the moulds occupy significant space within the blade manufacturing facility. Therefore, most blade manufacturing facilities may only have one or two moulds.

In order to increase the rate of production of wind turbine blades, it is desirable to minimise the 'in-mould time', i.e. the time in which the mould is utilised to produce a blade. It is against this background that the present invention has been developed.

SUMMARY OF THE INVENTION

According to a first aspect of the present invention there is provided a method of making a prefabricated root section for a wind turbine blade. The method comprises: providing a male mould extending longitudinally in a spanwise direction between an inboard end and an outboard end and extending transversely in a chordwise direction between a leading edge and a trailing edge, the male mould defining a male mould surface of convex curvature in the chordwise direction; providing a root plate having one or more root inserts projecting therefrom, the or each root insert being arranged along an arcuate path; arranging one or more inner fibrous layers on the male mould surface; arranging the root plate at the inboard end of the male mould such that the or each root insert overlays an inner fibrous layer at the root end of the mould. The method further comprises arranging one or more outer fibrous layers on top of the inner fibrous layers and on top of the or each root insert, providing resin to the fibrous layers and to the or each root insert and curing the resin to form the prefabricated root section for subsequent use in the manufacture of a wind turbine blade, wherein curing the resin to form the prefabricated root section is conducted before removing the prefabricated root section from the male mould.

The one or more inner fibrous layers may be arranged directly on the male mould surface or they may be arranged on top of one or more other layers, for example on top of a release layer or coating layer.

The or each root insert is configured to provide a means of connecting the blade to a wind turbine hub. Preferably the root inserts comprise pre-cured composite structures, for example cured resin reinforced with glass and/or carbon fibre. The root inserts are preferably pultruded components. The root inserts may comprise an aperture or a plurality of apertures configured to receive a respective bolt in a blade-hub connection. The apertures may each be defined by a bushing, for example a sleeve, which is preferably made from metal such as steel. The bushing may be embedded within the pre-cured composite structure of the root insert. The aperture or the bushing preferably comprises an internal screw thread. Alternatively, the root inserts may comprise threaded rods that are partially embedded within the composite structure and project out from one end to receive a nut in a blade-hub connection.

It will be appreciated that the inner layers may be arranged on the mould before or after the root plate is arranged. If the inner layers are arranged first, the root insert(s) may subsequently be arranged on top of the inner layers. If the root plate is arranged first, the inner layers may subsequently be inserted beneath the root insert(s).

Resin may be provided in the method in any number of ways. Preferably, resin is provided in a resin infusion process, for example vacuum-assisted resin transfer moulding (VARTM). A resin infusion process may comprise arranging a vacuum film over the male mould and sealing the vacuum film against a surface, such as a flange of the mould, to define a sealed region encapsulating the layup. A vacuum pump may be employed to remove air from the sealed region. At the same time, resin is admitted into the sealed region. The resin infuses throughout the fibrous layers and between the root insert(s) and the fibrous layers.

Instead of a vacuum film, a silicone sheet or equivalent may be used to cover the lay-up during the infusion process. This may result in the root section having a very smooth outer surface.

Alternatively, or additionally to an infusion process, the fibrous layers may be pre-impregnated with resin, for example they may comprise prepreg materials. Resin may alternatively be provided using any other suitable technique, for example wet hand lay-up, whereby resin is applied to the various components using a brush or roller for example.

Curing the resin to form the prefabricated root section is conducted before removing the prefabricated root section from the male mould. Surprisingly it was found that performing the curing in the male mould lead to significantly better quality of the prefabricated root section as well as the final wind turbine blade. It could be theorized, without being limited thereto, that this is due to better alignment of fibres in the products since the fibrous layers in the prefabricated root section wherein the resin is cured cannot shift or create even small wrinkles during subsequent handling of prefabricated root section, whereas handling of a collection of fibrous material before curing (particularly when this involves rotation from a male mould to a female mould) always will lead to some shifting of the fibrous layers or fibres within the fibrous layers.

Curing the resin may comprise arranging the male mould in an oven. The male mould is preferably a relatively inexpensive structure. For example, the male mould is preferably not a heated mould.

The method may further comprise attaching the root plate to the male mould to fix the position of the root plate and root insert(s) relative to the male mould, for example a face plate of the male mould. The root plate preferably comprises datum features for aligning with corresponding datum features of the male mould, such as on the face plate of the male mould. The root plate may be attached to the male mould by bolts and/or clamps for example.

After curing the resin, the method may further comprise removing the prefabricated root section from the male mould, turning the prefabricated root section through substantially 180 degrees around a horizontal axis to flip the prefabricated root section upside-down, and supporting the prefabricated root section in a separate support frame.

The method may further comprise conducting one or more finishing operations on the prefabricated root section when it is supported in a support frame. These operations may include cutting or trimming the edges of the root section; inspecting and/or conducting non-destructive testing of the structure; sanding and/or painting the surface; removing a peel ply layer if included in the structure.

The number of fibrous layers arranged at the inboard end of the mould may be more than the number of fibrous layers arranged at the outboard end such that the resulting prefabricated root section is thicker at its inboard end than at its outboard end.

In a second aspect of the present invention there is provided a prefabricated root section for use in the manufacture of a wind turbine blade. The prefabricated root section comprises an outer shell formed as a cured composite laminate, the outer shell extending longitudinally in a spanwise direction between an inboard end and an outboard end and extending transversely in a chordwise direction between a leading edge and a trailing edge, a root plate arranged at the inboard end of the outer shell, and one or more root inserts projecting from the root plate, the or each root insert being arranged along an arcuate path and being embedded within the outer shell between inner and outer layers of the laminate.

The prefabricated root section is a large, cured composite member that forms a large spanwise part of the blade root. Preferably the prefabricated root section has a spanwise length constituting between 5% to 20% of the total length of a wind turbine blade in which it is to be incorporated. Alternatively, the pre-fabricated root section may have a spanwise length of between 5 m and 15 m. In a particularly preferred embodiment, the total blade length is approximately 80 m to 120 m, whilst the length of the prefabricated root section is approximately 8 m to 12 m (i.e. approximately 10% of the total blade length). It is preferred that the prefabricated root section forms a part of an outer surface of the blade shell of the as-cured blade shell. In other words, in the part of the outer blade shell that is formed by the prefabricated root section, no fibre layers are arranged closer to the outer surface of the blade than the prefabricated root section.

The root plate of the prefabricated root section may comprise datum features for aligning with corresponding datum features of a face plate of a wind turbine blade mould. If datum features are also used for aligning of the root plate to the male mould during the preparation of the prefabricated root section, it is preferred that the same datum features of the root plate also are used for aligning the prefabricated root section to (the face plate of) the wind turbine blade mould.

The outer shell of the prefabricated root section may taper in thickness moving from the inboard end towards the outboard end. Preferably the inboard end of the root section has a thickness of between 80-150 mm and the outboard end has a thickness between 2 mm to 10 mm.

In a further aspect of the present invention there is provided a method of making a wind turbine blade. The method comprises: providing a female blade mould extending in a spanwise direction between first and second ends; arranging fibrous material in the blade mould; arranging a prefabricated root section as described above adjacent to the blade mould; providing resin to the fibrous material and between the fibrous material and the prefabricated root section; and curing the resin to form an outer shell portion of the blade integrated with the prefabricated root section.

In a further aspect of the present invention there is provided a method of making a wind turbine blade. The method comprises: providing a female blade mould extending in a spanwise direction between first and second ends; arranging fibrous material in the blade mould; arranging a prefabricated root section made according to the method as described above, in or adjacent to the blade mould; providing resin to the fibrous material and between the fibrous material and the prefabricated root section; and curing the resin to form an outer shell portion of the blade integrated with the prefabricated root section.

In a highly preferred embodiment, the prefabricated root section is arranged to form part of an outer surface of the blade after curing the resin. Traditionally, the outer shape of a wind turbine blade shell has been carefully shaped to ensure a perfect airfoil. This required the use of female mould for blade shell. Surprisingly, it was found that for the blade root section a less than perfect airfoil, which is achieved using a male mould, can be more than compensated by improvement in the structural quality of the resulting composite material. Arranging of the prefabricated root section to form part of an outer surface of the blade after curing of the resin may be done by arranging the prefabricated root section inside the female mould or by arranging the prefabricated root section adjacent to the female mould as discussed elsewhere. By forming part of an outer surface of the blade after curing the resin is meant that at least a part of the prefabricated root section will be on the outer surface of the final blade shell after normal blade finish, such as for example gluing, grinding, or polishing, and only be covered by for example paint, vortex generators, or sensors, but not layers of fibrous material.

The blade mould is preferably a half-mould shaped to form one half of a wind turbine blade, e.g. a windward (or pressure) half or a leeward (or suction) half of the blade shell. The blade mould may be a full length blade mould, in which case the first end may be shaped as the root end of the blade and the second end may be shaped as the tip end. In this case, the prefabricated root section is supported in the root end of the mould. Alternatively, the blade mould may be truncated in comparison to a full-length mould. If the mould is truncated at the first end, the prefabricated root section may be supported separately, for example in a separate support frame arranged adjacent to the first end of the mould. The mould may also be truncated at the second end, for example if it is used to form part of a modular wind turbine blade. By the prefabricated root section being arranged adjacent to the blade mould is here meant that most of the prefabricated root section is outside the (female) blade mould and it encompass that a smaller part of the prefabricated root section used for creating a transition between the root section and the rest of the blade shell may be inside the (female) blade mould. For example, a part of the prefabricated root section being tapered for enhancing transfer of forces to a corresponding tapered section of the rest of the blade shell may be arranged inside the blade mould to facilitate for heating via the mould for curing of resin used between parts of the prefabricated root section and the rest of the blade shell. Also, layers of fibrous material may be arranged over at least a part of the prefabricated root section and reaching towards and over a part of the blade shell within the (female) blade mould. Use of a prefabricated root section adjacent to the main blade mould allows for use somewhat smaller blade moulds, which typically will lead to a considerable reduction in cost for the mould, since the cost of a mould is more or less proportional to the surface area of the mould.

The method may comprise arranging the prefabricated root section on top of the fibrous material.

The female mould or the support frame arranged adjacent to the first end of the female mould may comprise a face plate at the first end, the face plate being provided with datum features, and the method may comprise aligning datum features of the root plate of the prefabricated root section with the datum features of the face plate. Such use of datum features is highly advantageous as it allows for very precise alignment of the prefabricated root section to the rest of the blade, and particularly precise alignment of the root inserts of the prefabricated root section to the rest of the blade, which was found to lead to better predictability of blade performance and over time may lead to reduced fatigue degradation of the parts of the wind turbine for example through reduction of vibration.

The prefabricated root section may be arranged in a portion of the blade mould that is substantially unheated during curing of the resin.

The method may further comprise supporting the prefabricated root section in a support frame arranged adjacent to the first end of the blade mould. The blade mould may be located inside a building and at least part of the support frame may be arranged outside the building.

In yet a further aspect of the present invention there is provided a wind turbine blade made according to the method described above, or having a prefabricated root section as described above.

BRIEF DESCRIPTION OF THE DRAWINGS

Non-limiting examples of the present invention will now be described with reference to the accompanying drawings, in which.

DETAILED DESCRIPTION

Figure 1:
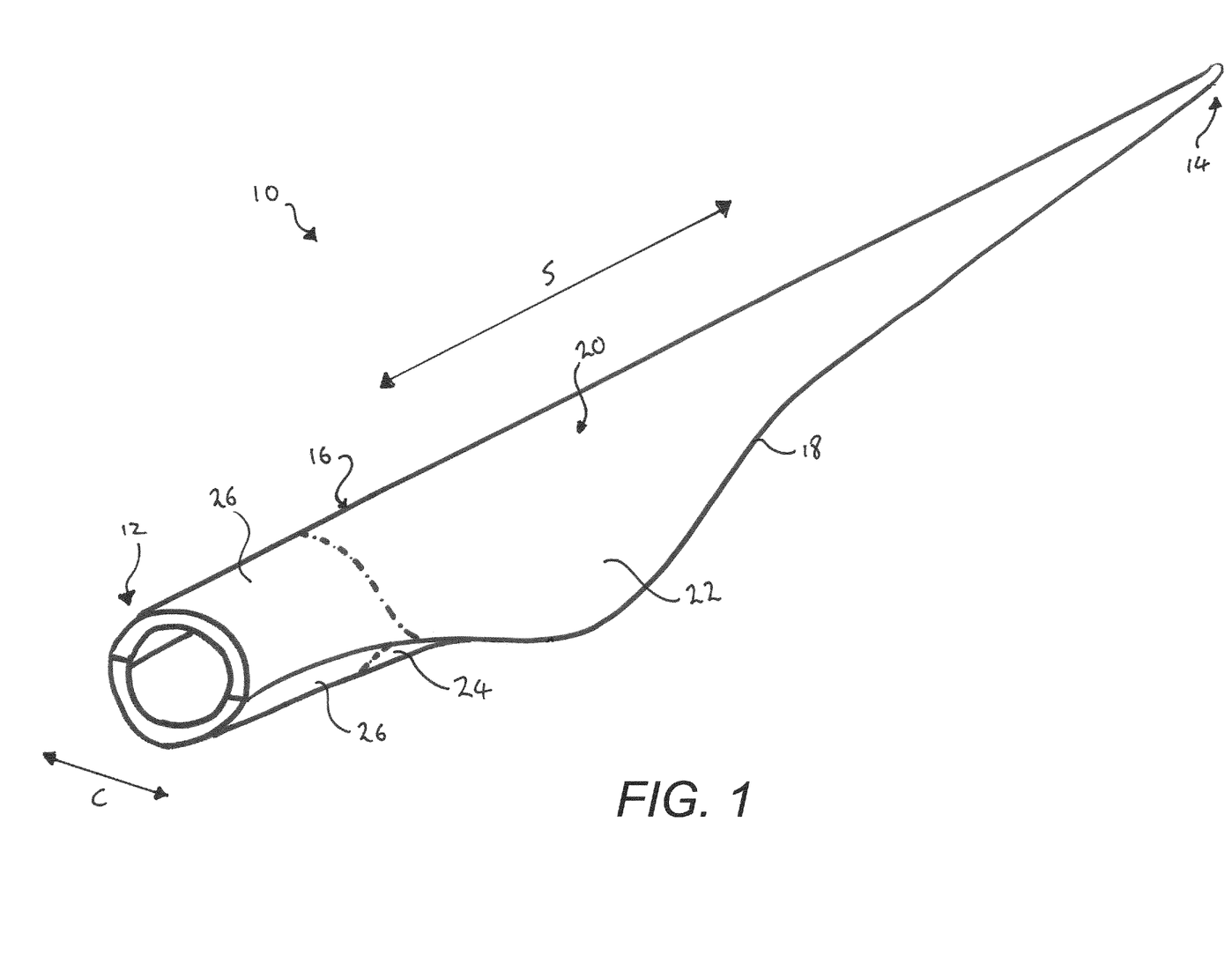
FIG. 1 is a schematic perspective view of a wind turbine blade incorporating prefabricated root sections according to an example of the present invention.

FIG. 1 is a schematic perspective view of a wind turbine blade 10 according to an example of the present invention. The blade 10 extends in a spanwise direction (S) between a root end 12 and a tip end 14, and in a chordwise direction (C) between a leading edge 16 and a trailing edge 18. The blade 10 comprises an outer shell 20 formed as a composite laminate, for example from glass-fibre reinforced plastic (GFRP). The outer shell 20 comprises first and second half shells 22, 24, e.g. a leeward (suction) half shell 22 and a windward (pressure) half shell 24. The half shells 22, 24 are bonded together by adhesive along their respective leading and trailing edges 16, 18. The root end 12 of each half shell 22, 24 comprises a prefabricated root section 26.

A method of manufacturing a prefabricated root section 26 and a method of manufacturing the blade 10 incorporating the prefabricated root sections 26 will now be described by way of example with reference to the remaining figures.

Figure 2:
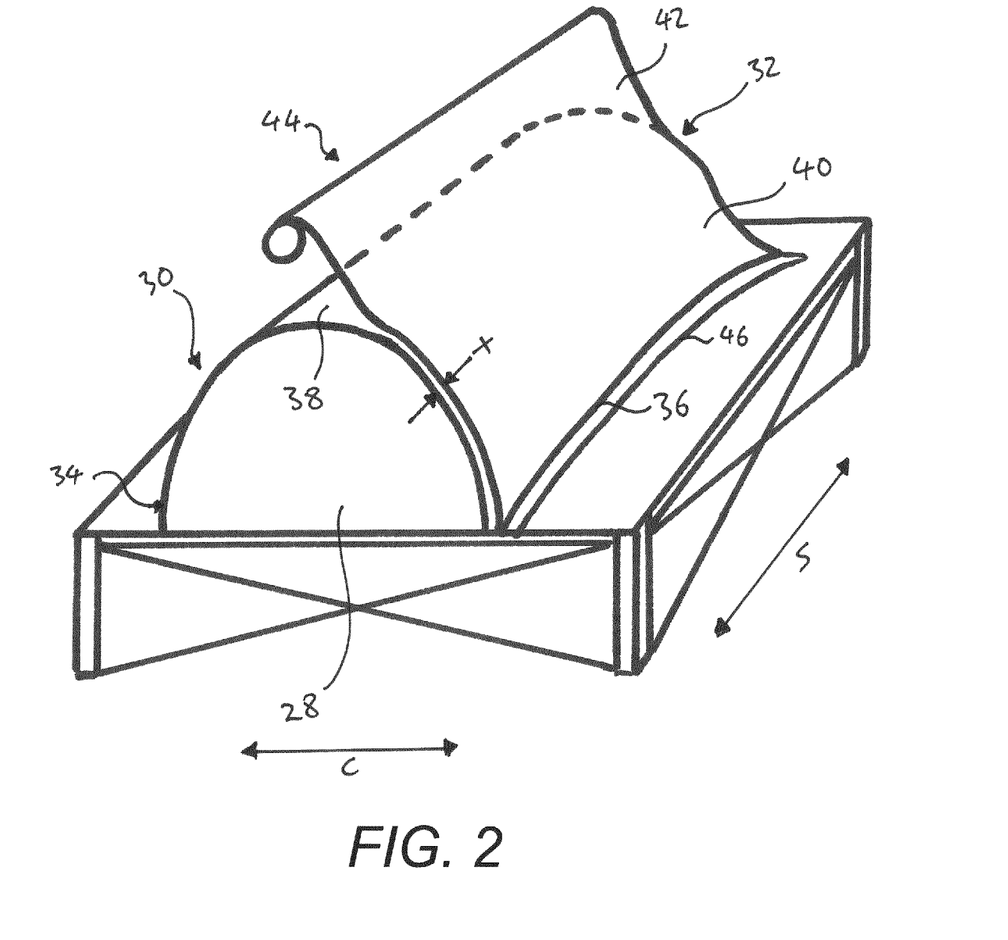
FIG. 2 is a schematic perspective view of a male mould for manufacturing a prefabricated root section, and shows inner fibrous layers being arranged on the mould.

FIG. 2 is a schematic perspective view of a male mould 28 shaped to form a prefabricated root section 26 of the wind turbine blade 10. The male mould 28 extends longitudinally in a spanwise direction (S) between an inboard end 30 and an outboard end 32, and transversely in a chordwise direction (C) between a leading edge 34 and a trailing edge 36. The male mould 28 defines a male mould surface 38 of convex curvature in the chordwise direction (C). The inboard end 30 of the mould surface 38 has a semi-circular profile in this example, whilst the outboard end 32 is elongated in the chordwise direction (C) to form part of an airfoil profile. In other embodiments, the mould surface 38 may have a substantially constant profile (e.g. semi-circular) along its entire spanwise length.

In order to produce the root section 26, one or more inner fibrous layers 40 (also known as 'plies') are initially arranged on the male mould surface 38. These layers 40 will form the innermost structural layers of the root laminate. In this example, the fibrous layers 40 are glass-fibre fabric layers. The fabric 42 may have fibres extending in any suitable direction, for example it may comprise unidirectional fibres, or it may be biax or triax fabric. Preferably the fabric 42 is dry fabric, but in other examples it may contain resin, e.g. prepreg or semipreg.

In this example, the fabric 42 is stored on a roll 44 before being draped or stretched over the male mould surface 38. An edge 46 of the fabric 42 may initially be clamped along an edge 34, 36 of the male mould 28, in this case along the trailing edge 36. The fabric 42 is then unrolled in the chordwise direction (C) over the convex mould surface 38 before being clamped along the leading edge 34. In other examples, the fabric 42 could be unrolled in the opposite direction, i.e. from the leading edge 34 towards the trailing edge 36.

A plurality of inner layers 40 are preferably arranged on the mould 28. The layers 40 may be arranged successively until a required thickness (X) has been built up. Alternatively, the layers 40 may be pre-assembled as a preform and draped over the male mould surface 38 in a single step. The layers 40 may have the same or different dimensions in the spanwise direction (S). In preferred embodiments, layers 40 with successively shorter spanwise (S) lengths may be used to create a laminate that tapers in thickness (X) moving from the inboard end 30 towards the outboard end 32 of the mould 28. One or more other layers such as coating layers or release layers may be applied to or arranged on the mould surface 38 prior to arranging the inner layers 40.

Use of a male mould 28 to form a root section 26 is particularly advantageous because the fabric layers 40 do not tend to form wrinkles or creases when arranged on the male mould 28. The convex curvature of the mould 28 means that any creases or wrinkles in the layers 40 are naturally removed under the influence of gravity. The difficulties and problems associated with arranging plies against the steep sides at the root end of a female blade mould are therefore avoided.

Figure 3:
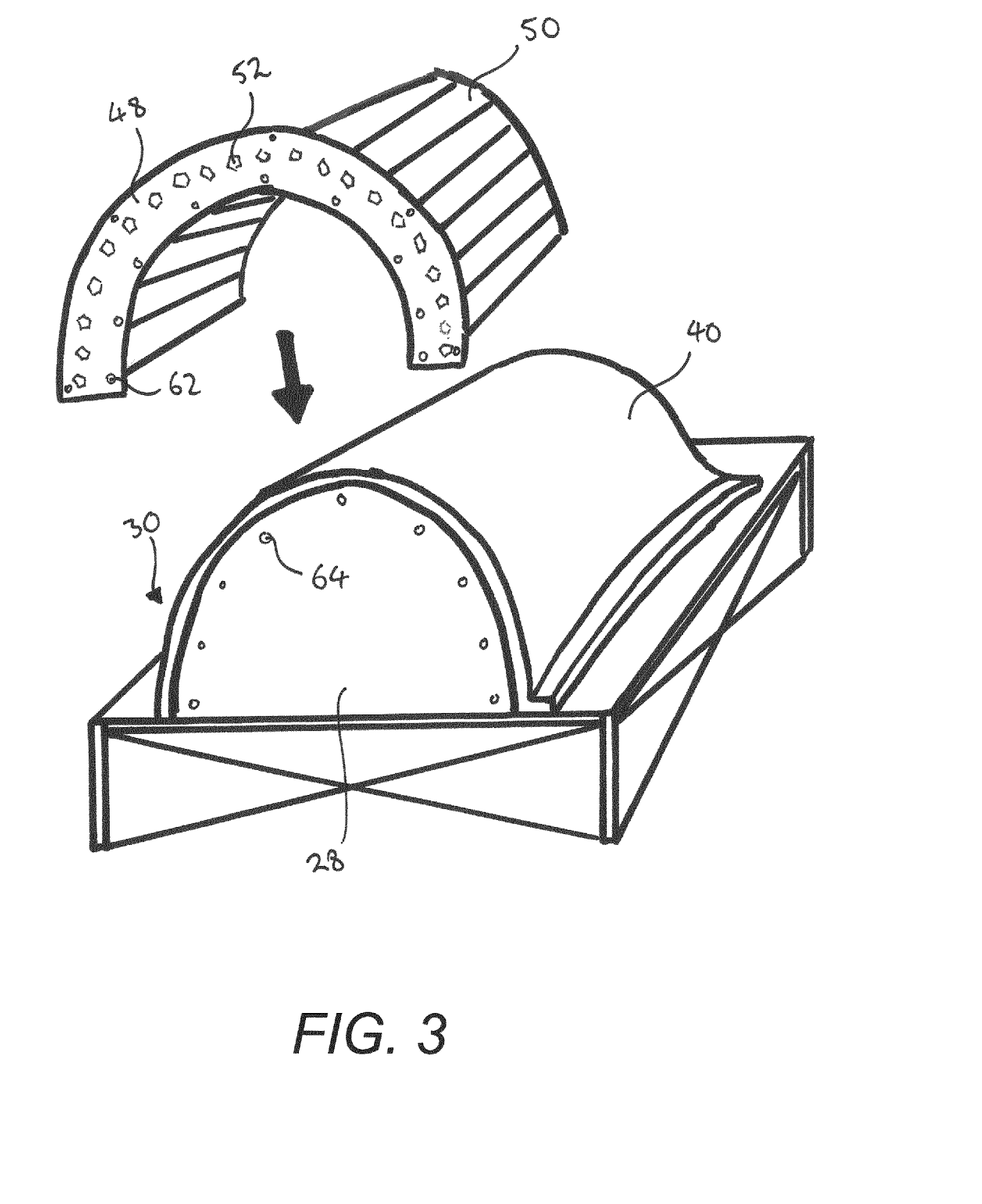
FIG. 3 is a schematic perspective view of a root plate and root inserts being arranged on the male mould.

FIG. 3 illustrates the next stage of the fabrication process, which involves arranging a root plate 48 at the inboard end 30 of the male mould 28. The root plate 48 in this example is a metal plate having a semi-circular profile. A plurality of root inserts 50 (also known as 'spears') project from the root plate 48 along an arcuate path (in this case along a semi-circular path). Each root insert 50 is bolted to the root plate 48 by a respective bolt 52.

Figure 4:
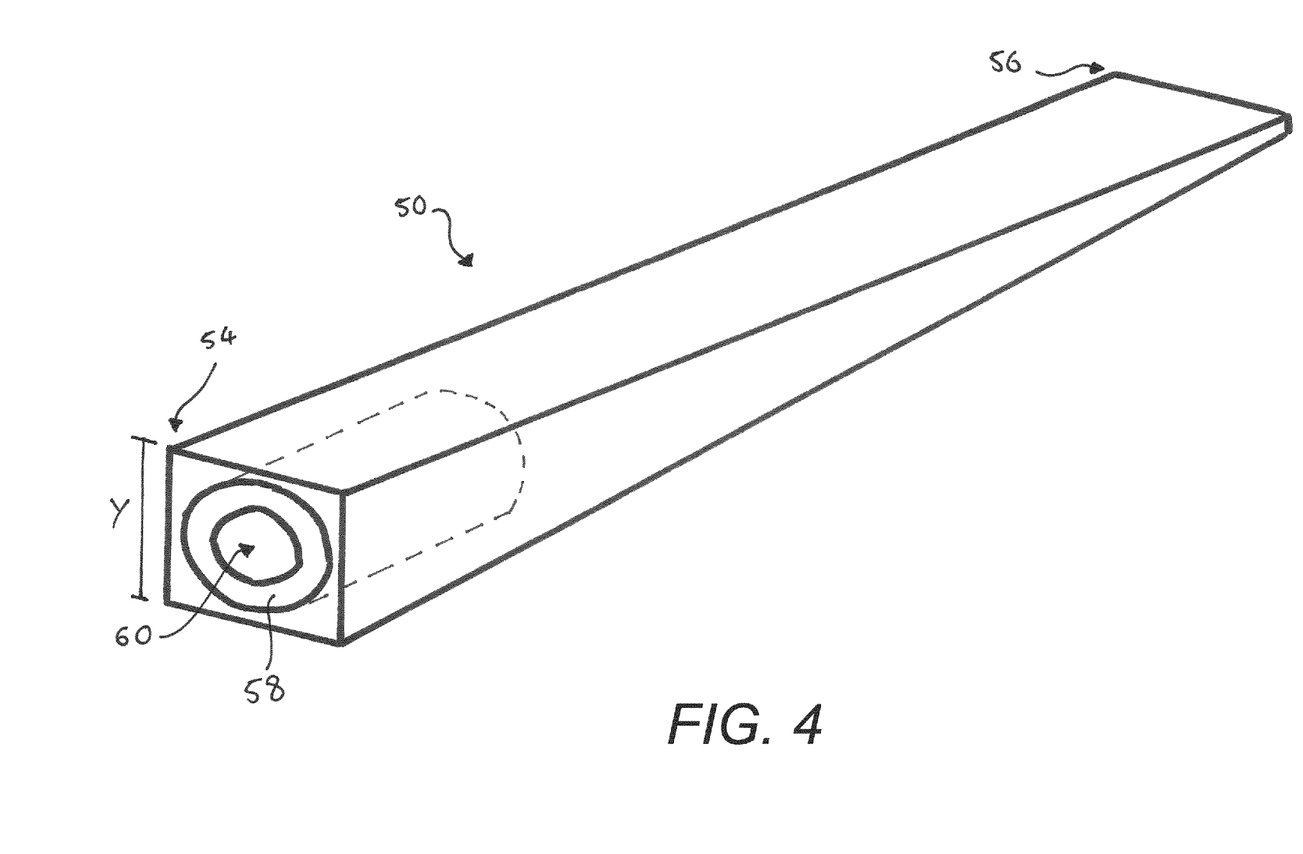
FIG. 4 is a schematic perspective view of a root insert.

FIG. 4 shows a root insert 50 by way of example. The root insert 50 comprises a pre-cured composite structure such as GFRP or CFRP (carbon-fibre reinforced plastic), which is preferably formed in a pultrusion process. The root insert 50 is wedge shaped and tapers in thickness (Y) moving from a proximal end 54 (arranged at the root plate 48—shown in FIG. 3) towards a distal end 56. The proximal end 54 has a generally rectangular profile. The root insert 50 comprises a bushing 58, preferably made of metal, which is embedded within the composite structure. The bushing 58 defines an aperture 60 at the proximal end 54 of the root insert 50. The bushing 58 has an internal screw thread. Bolts 52 (shown in FIG. 3) are received in the bushings 58 in order to connect the root inserts 50 to the root plate 48 during the manufacturing process, and subsequently to connect the finished blade 10 to a wind turbine hub.

The root insert 50 shown in FIG. 3 is merely one example of a root insert and root inserts having different shapes, sizes and configurations may also be used in the present method. In other embodiments, a root insert may be provided that includes a plurality of apertures for receiving a respective plurality of bolts. For example, a single root insert having a profile corresponding to the combined profile of the plurality of root inserts shown in FIG. 3 may be used.

Referring again to FIG. 3, the root plate 48 is arranged at the inboard end 30 of the male mould 28 such that the root inserts 50 overlay the inner fibrous layers 40 at the inboard end 30. It will be appreciated that the inner fibrous layers 40 could be arranged on the mould 28 before or after the root plate 48 is arranged. For example, the inner fibrous layers 40 could be inserted beneath root inserts 50 that have been previously arranged on the mould 28.

The root plate 48 in this example comprises datum features 62 for aligning with corresponding datum features 64 of the male mould 28. The datum features 62 in this example are bolt holes in the root plate 48, which precisely align with bolt holes 64 at the inboard end 30 of the male mould 28. The root plate 48 is bolted to the male mould 28 with a series of bolts 66 (shown in FIG. 5) that extend through these bolt holes 62, 64. In other examples, any suitable fastening means or clamps may be used to secure the root plate 48 to the male mould 28. The datum features 62, 64 ensure precise alignment of the root plate 48 and root inserts 50 with the male mould 28.

Figure 5:
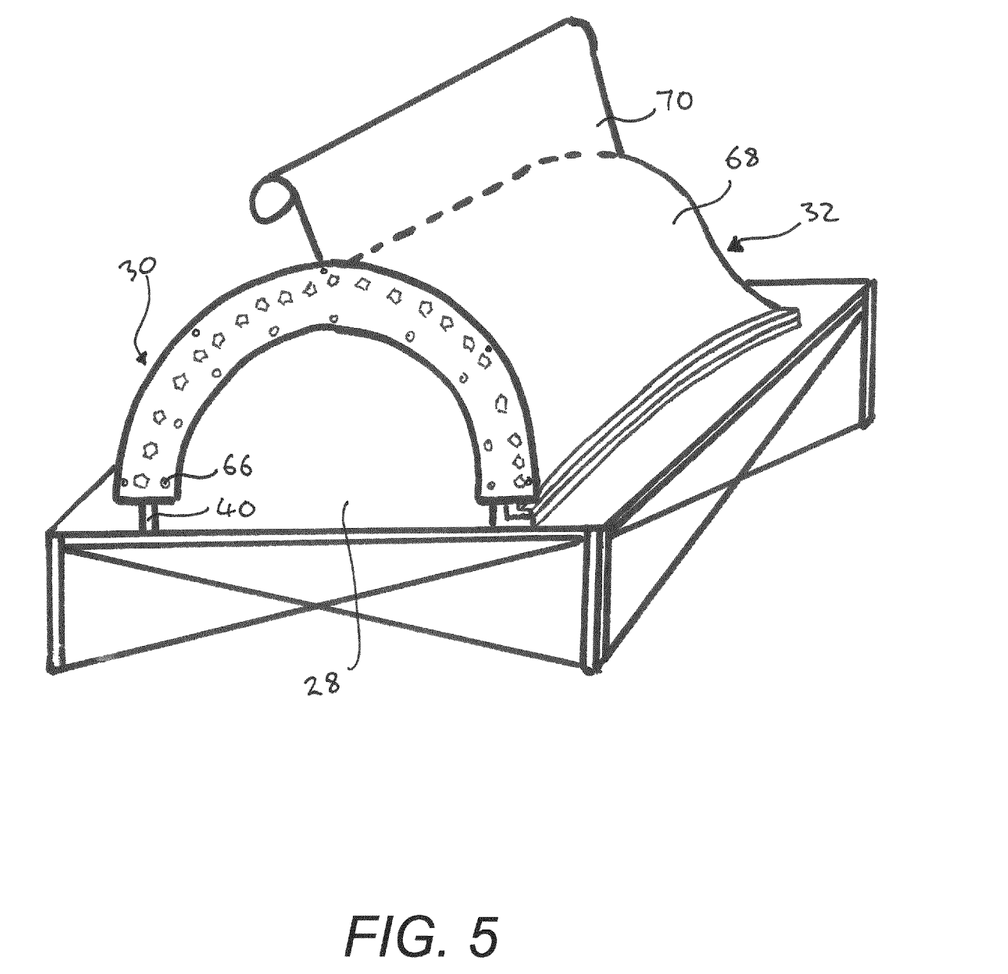
FIG. 5 is a schematic perspective view showing outer fibrous layers being arranged on the male mould.

FIG. 5 is a schematic perspective view of a further stage in the manufacture of the root section 26 in which one or more outer fibrous layers 68 (e.g. 'plies') are arranged on top of the inner fibrous layers 40 (shown in FIG. 2) and on top of the root inserts 50 (shown in FIG. 3). These outer fibrous layers 68 will form the outermost structural layers of the root laminate. The root inserts 50 thereby become sandwiched between the inner and outer fibrous layers 40, 68 at the inboard end 30 of the male mould 28.

The outer fibrous layers 68 are preferably glass-fibre fabric layers. The fabric 70 may have fibres extending in any suitable direction, for example it may comprise unidirectional fibres, or it may be biax or triax fabric. Preferably the fabric 70 is dry fabric, but in other examples it may contain resin, e.g. prepreg or semipreg. In this example, the outer layers 68 are draped or stretched over the male mould surface 38 in substantially the same way as previously described for the inner layers 40. In other examples, a plurality of outer layers 68 may be preassembled as a preform before being arranged on the male mould 28 in a single step.

Figure 9:
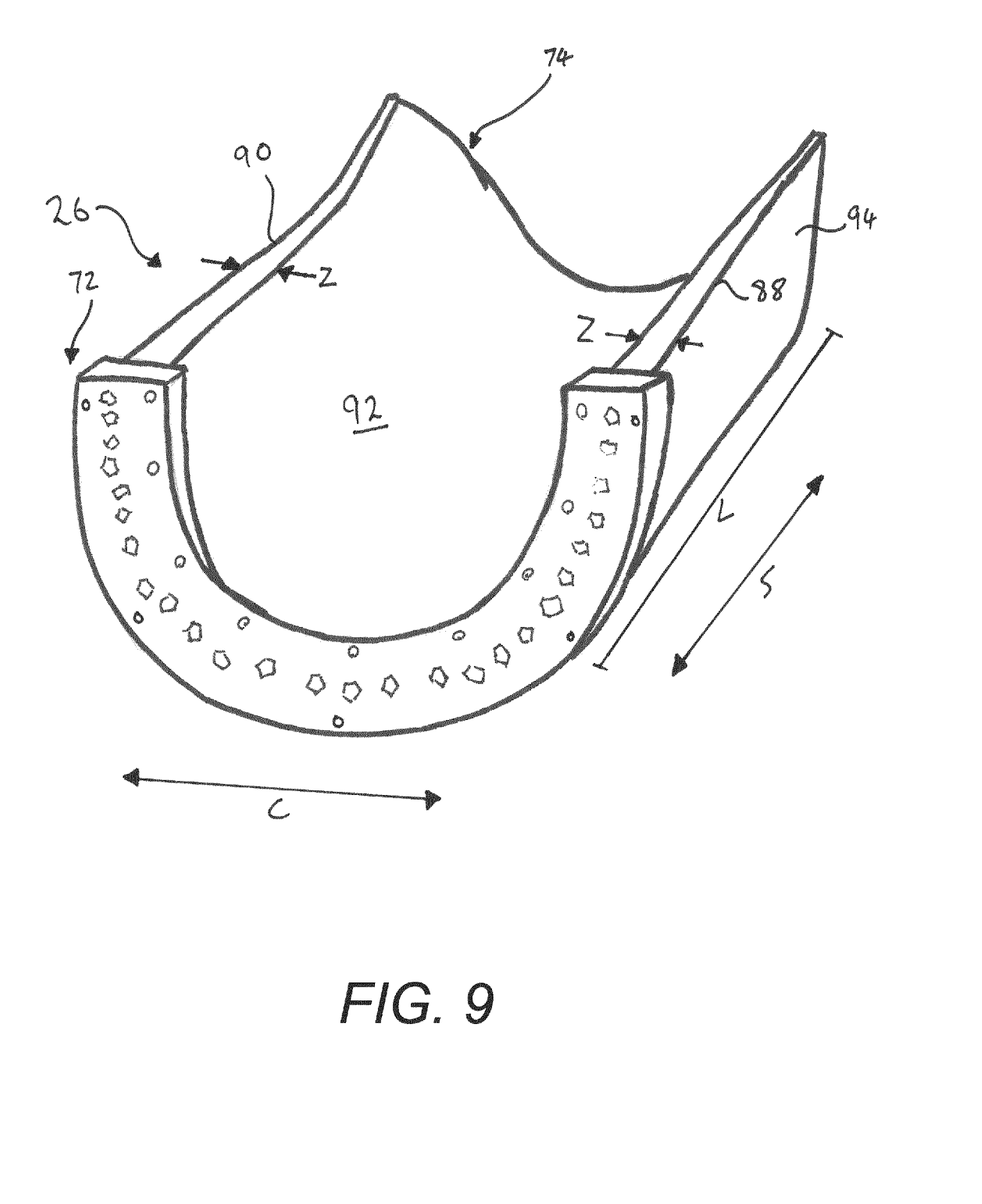
FIG. 9 is a schematic perspective view of the prefabricated root section.

The fibrous layers, i.e. the inner fibrous layers 40 and the outer fibrous layers 68, are preferably arranged such that the total number of fibrous layers 40, 68 arranged at the inboard end 30 of the mould 28 is greater than the total number of fibrous layers 40, 68 arranged at the outboard end 32. The resulting root laminate is therefore thicker at its inboard end 72 than at its outboard end 74 (as shown in FIG. 9).

Figure 6:
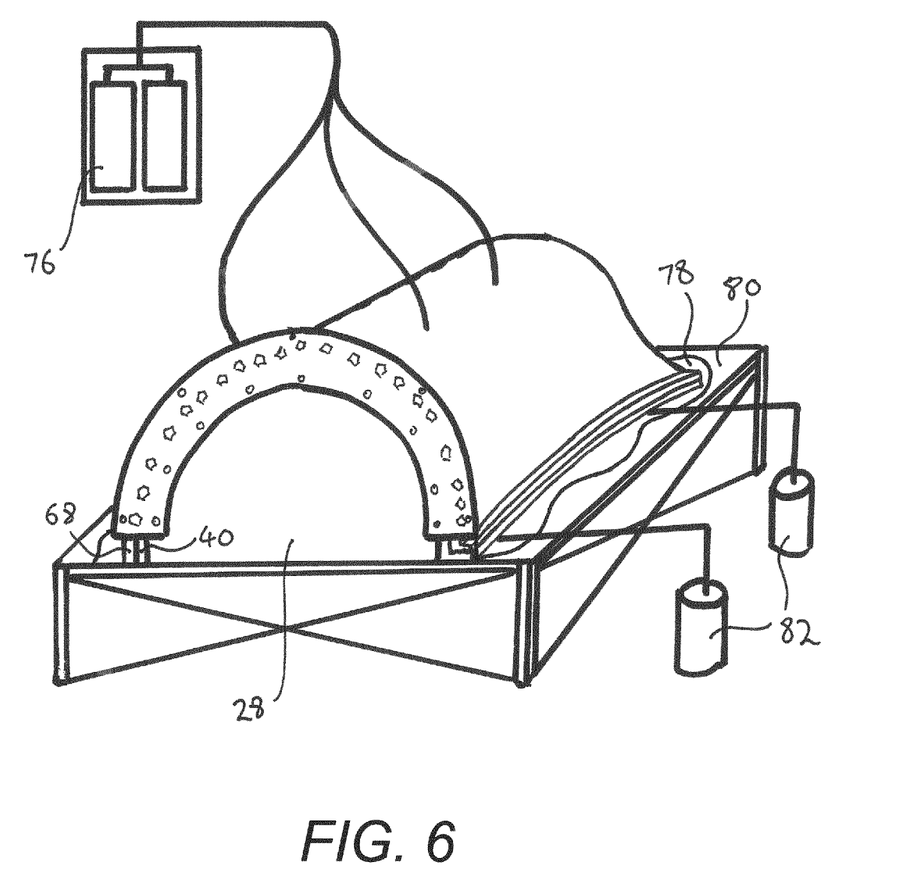
FIG. 6 is a schematic perspective view of a resin infusion process.

Referring to FIG. 6, after the various components have been arranged on the male mould 28, resin 76 may be supplied to the components in a vacuum assisted resin transfer moulding (VARTM) process. Specifically, the mould 28 is covered with a vacuum film 78, which is sealed against a surface 80 such as a flange of the mould 28 to define a sealed region encapsulating the components. A vacuum pump 82 is employed to remove air from the sealed region. Concurrently, resin 76 is admitted into the sealed region. The resin 76 infuses throughout the fibrous layers 40, 68 and between the root inserts 50 and the fibrous layers 40, 68, aided in part by the vacuum pressure within the sealed region.

It will be appreciated that a VARTM process is only one of a number of applicable methods for providing resin 76 to the fibrous layers 40, 68 and to the root inserts 50, and the invention is by no means limited to the use of a VARTM process. In other examples resin 76 may already be contained in the fibrous layers 40, 68 in the case of prepreg or semipreg materials, or wet hand lay-up may be used, whereby the resin 76 is applied to the various components using tools such as a brush or roller.

Figure 7:
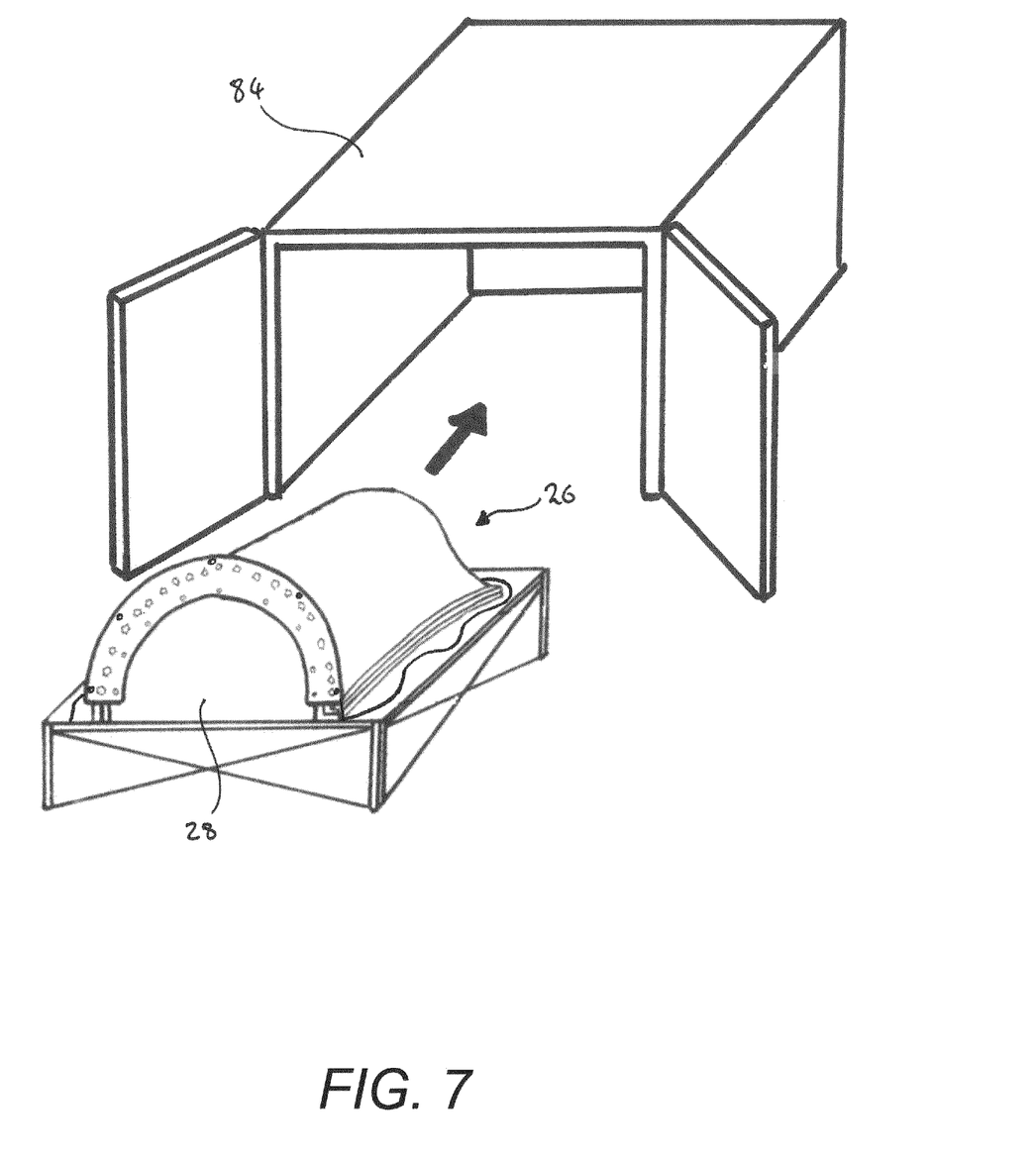
FIG. 7 is a schematic perspective view showing the male mould being transferred to an oven for a curing process.

Referring now to FIG. 7, the next stage in the process involves curing the resin 76 in the root section 26. In this example the male mould 28 is arranged in an oven 84 to cure the resin 76. This is particularly advantageous because it provides very uniform heating and accurate control of the temperature throughout the curing cycle such that thermal stresses and other temperature-related defects are avoided or minimised. Using an oven 84 to cure the resin 76 also avoids the need for heating devices and associated sensors built in to the male mould 28. Accordingly, a relatively inexpensive and simple male mould 28 can be used.

Figure 8:
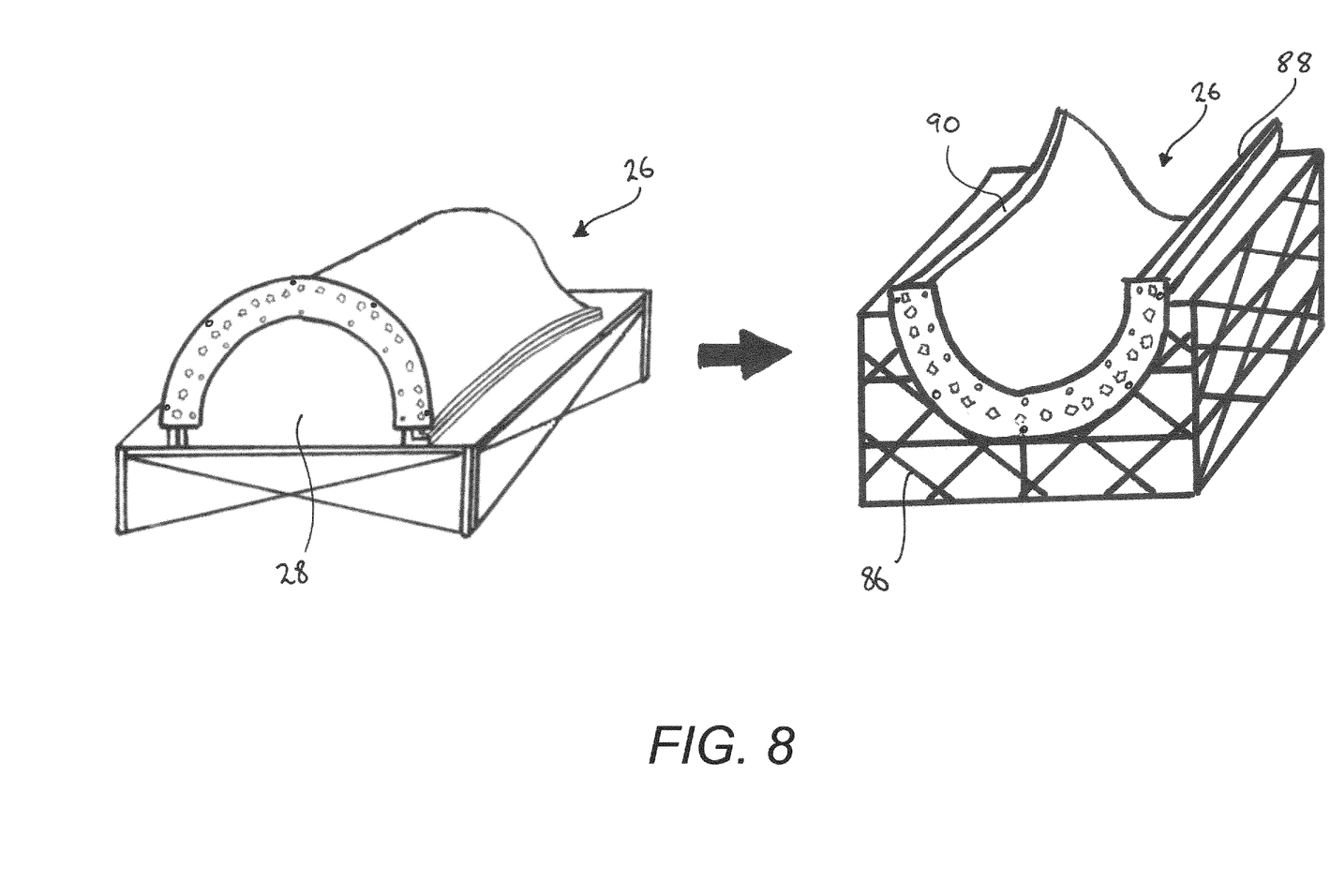
FIG. 8 shows a prefabricated root section being removed from the male mould and transferred to a support frame.

Referring to FIG. 8, once the resin 76 has cured, the prefabricated root section 26 is removed from the male mould 28. The prefabricated root section 26 is turned through substantially 180 degrees around a horizontal axis to flip the prefabricated root section upside-down and supported in a separate support frame 86. The root section 26 may be stored on the frame 86 until it is required. In addition, one or more finishing operations may be performed on the root section 26 whilst it is supported in the frame 86. Such operations may include cutting or trimming the edges 88, 90 of the root section 26, grinding or re-finishing, inspection and non-destructing testing, and/or the removal of a peel ply layer if one has been included in the laminate shell 92 of the root section 26. It is advantageous to perform such operations with the root section 26 supported in a separate frame 86 because the male mould 28 is then made available for making a further root section 26 in parallel with these finishing operations being performed.

FIG. 9 shows the finished prefabricated root section 26 made according to the method described above. The prefabricated root section 26 comprises an outer shell 92 formed as a cured composite laminate. The outer shell 92 extends longitudinally in a spanwise direction (S) between an inboard end 72 and an outboard end 74 and extends transversely in a chordwise direction (C) between a leading edge 88 and a trailing edge 90. The outer shell 92 tapers in thickness (Z) moving from the inboard end 72 towards the outboard end 74. The root inserts 50 described previously are embedded between the inner and outer laminate layers 40, 68 at the thick inboard end 72 of the shell laminate 92.

In this example the outer shell 92 has a thickness (Z) of between 80 mm to 150 mm at the inboard end 72, and a thickness (Z) of between 2 mm to 10 mm at the outboard end 74. The prefabricated root section 26 preferably has a spanwise length (L) constituting between 5% to 20% of the total length of a wind turbine blade 10 in which it is to be incorporated. In this example the prefabricated root section has a spanwise length (L) of approximately 8 m and is designed to be incorporated in a blade 10 approximately 80 m in length, the root section 26 therefore constituting approximately 10% of the total blade length. However, the method described above can be used to make root sections 26 of any dimensions with any suitable shell thicknesses (Z).

The vacuum-bagging process described previously may result in the prefabricated root section 26 having an outer surface 94 that is not completely smooth. It has surprisingly been found that this rough or textured surface 94 presents some aerodynamic advantages in the finished blade 10 and can help airflow to remain attached to the surface of the blade 10. However, in some cases it may be desirable to form the root section 26 with a very smooth outer surface 94. In this case, a silicone sheet or equivalent may be used to cover components during the infusion process instead of a vacuum film 78. This results in the root section 26 having a very smooth outer surface 94.

A method of making a wind turbine blade incorporating the prefabricated root section 26 will now be described by way of example with reference to FIG. 10.

Figure 10:
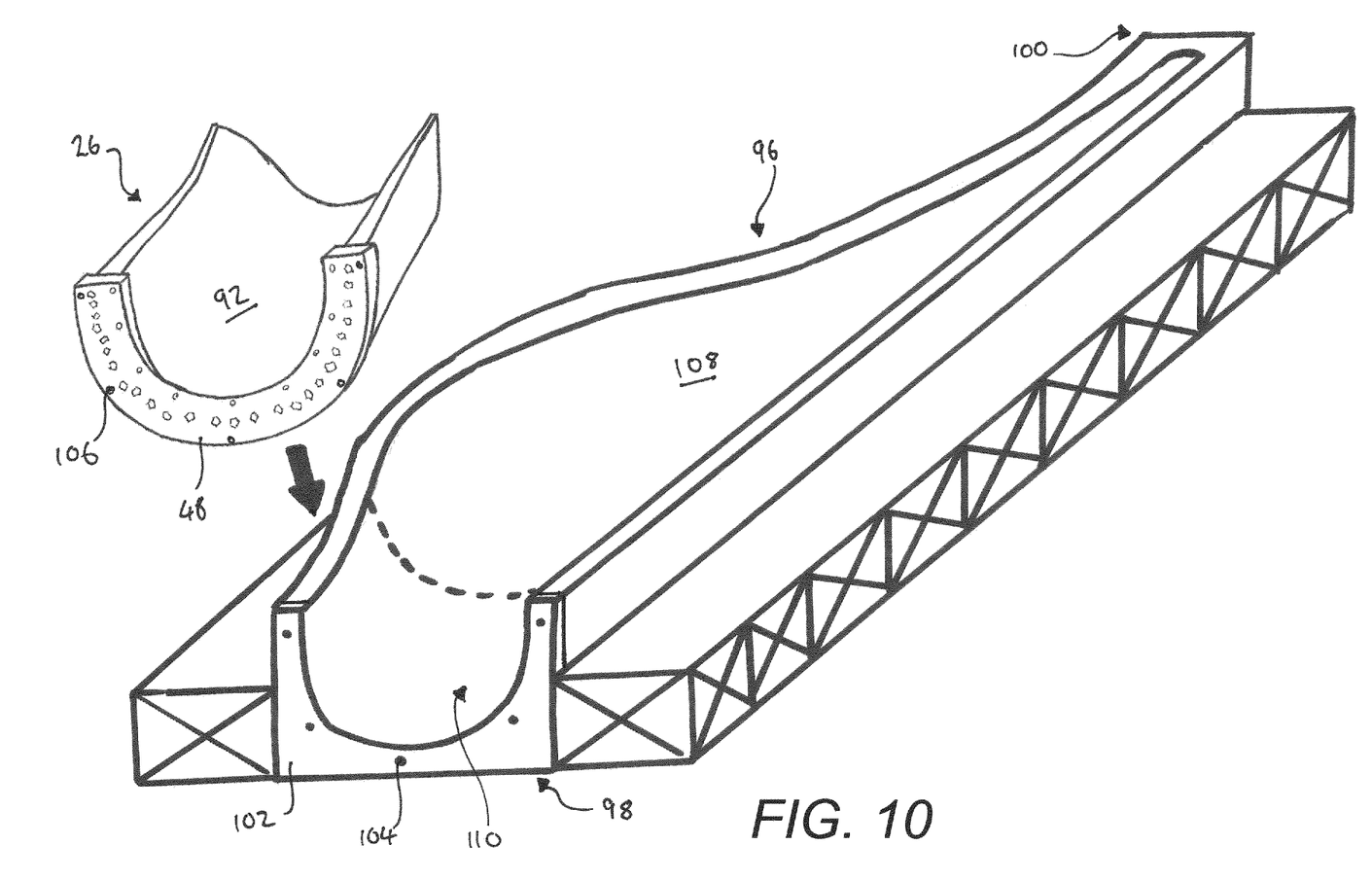
FIG. 10 is a schematic perspective view of the prefabricated root section being positioned in a full length female blade mould.

FIG. 10 shows a female wind turbine blade mould 96 extending in a spanwise direction (S) between first and second ends 98, 100. In this example, the blade mould 96 is a half mould shaped to form a half shell 22, 24 of a wind turbine blade 10, e.g. a leeward half shell 22 or a windward half shell 24. The blade mould 96 in this example is a full length blade mould 96, wherein the first end 98 has the shape of the blade root 12, and the second end 100 is shaped to form the blade tip 14. A face plate 102 is secured at the first end 98 of the blade mould 96. The face plate 102 is provided with datum features 104, which are configured to align with datum features 62, 106 of the root plate 48 of the prefabricated root section 26.

Several layers of fibrous material 108 (e.g. glass fibre and/or carbon fibre layers) are arranged in the female blade mould 96 to form the laminate layers of the blade shell 20. Other blade material or components such as core material and spar caps may be arranged in the mould 96 according to the particular blade design. The prefabricated root section 26 is then lifted from its support frame 86 (shown in FIG. 8) and lowered into the root end 98 of the female blade mould 96. The prefabricated root section 26 is preferably positioned such that it at least partially overlaps some of the previously arranged fibrous layers 108 at the first end 98 of the blade mould 96. The datum features 62, 106 of the root plate 48 are aligned with the datum features 104 of the face plate 102, and the root plate 48 is bolted or otherwise secured firmly to the face plate 102.

Resin is provided to the fibrous material 108 and between the fibrous material 108 and the prefabricated root section 26. The resin may be provided by any suitable means, and may for example be provided in a VARTM process similar to that described above with reference to the manufacture of the prefabricated root section 26. Alternatively, or additionally, prepreg or semipreg materials already containing resin may be used. The resin is then cured to form a finished half shell 22, 24 comprising an integrated prefabricated root section 26.

In the above process, the blade mould 96 preferably includes integral heating means, which are utilised during the curing process. However, as the root section 26 of the blade 10 has been prefabricated, there is little or no requirement for heating in this region 110 of the blade mould 96. Accordingly, the root end 98 of the blade mould 96 may be substantially unheated during the curing process of the rest of the blade since the prefabricated root section has already been cured. This allows the cost and complexity of the blade mould 96 to be reduced in comparison to prior art blade moulds which require complex heating devices at the root end to cure the thick laminate in this region. The overall cure time for the blade 10 is significantly reduced in comparison to conventional blade manufacturing processes, where heating and/or curing of the thick root laminate was the rate-limiting step. The shell thickness outside the root section 26 is approximately the same thickness or thinner than the outboard end 74 of the root section 26 (e.g. between 2-10 mm). Therefore, there are no very thick sections to be cured during the process for the shell outside the root section 26.

Although a full-length female blade mould 96 is shown in FIG. 10, in other examples the blade mould 96 may be truncated at the first and/or second end 98, 100 in comparison to a full-length blade mould 96 shown in FIG. 10. If the blade mould 96 is truncated at the first end 98, the prefabricated root section 26 may be supported outside the blade mould 96 adjacent to the first end 98 (for example in a separate support frame). This advantageously allows a shorter and less expensive blade mould 96 to be used. Furthermore, small variations in dimension of the outer surface 94 of the prefabricated root section 26 due to the layup on the male mould 28 will not lead to misalignment when placed inside the female mould 96. The blade mould 96 may be located inside a blade manufacturing building, whilst part or all of the support frame may be arranged outside the building. This reduces the space inside the building that is required for making the blade 10, and may allow more blade moulds 96 to fit within a building of a given size. In further examples, the mould 96 may alternatively or additionally be truncated at the second end 100, for example if it is used to form an inboard section of a modular wind turbine blade.

A similar process may be used to form the other half shell 22, 24. Once both half shells 22, 24 have been formed, they are then assembled together to form the complete blade 10. This may typically involve providing adhesive along the leading and trailing edges 16, 18 of one or both half shells 22, 24 before clamping the half shells together. Shear webs or a spar may be bonded between the half shells 22, 24 during this process in accordance with the particular blade design.

The present invention presents many advantages over the conventional method of manufacturing wind turbine blades described by way of background. In particular, the present invention provides a faster, more flexible and less expensive process for making blades 10 and increases the rate of production of blades 10.

The use of male moulds 28 to form the root sections 26 avoids the problems associated with arranging fabric against the steep sides at the root end of a conventional female blade mould. The root section 26 can be laid up relatively quickly on a male mould 28 and a higher quality root laminate 92 with fewer imperfections can be achieved.

The male mould 28 is relatively short in comparison to a blade mould 96 making it possible to fit within a conventional industrial-scale curing oven 84, which is not possible with a full length blade mould 96. This allows a multiplicity of relatively simple and inexpensive male moulds 28 to be used since they do not require integral heating apparatus. An oven 84 also provides uniform heating with high levels of control, resulting in a very high quality root laminate 92.

The time in which the main blade moulds 96 are utilised (the 'in mould time') is significantly reduced in comparison to conventional blade production processes. The prefabricated root section 26 of the present invention can be prepared in advance and relatively quickly positioned in place during production of a blade 10. The time-consuming process of laying up a root section in the main (female) blade mould 96 is therefore avoided. The production of prefabricated root sections 26 can also take place whilst the main blade moulds 96 are in use to further increase the output from the blade manufacturing facility.

The time taken to cure the resin in the main blade shell laminate 22, 24 is significantly reduced in comparison to conventional processes as the resin is already cured in the thick prefabricated root section 26. Consequently, it may be possible to dispense with heating devices in the root end 98 of the main blade mould 96 allowing cheaper blade moulds 96 to be produced. The cost of the main blade moulds 96 can be further reduced by truncating the moulds 96 and supporting the prefabricated root sections 26 outside the moulds 96.

Many modifications may be made to the above examples without departing from the scope of the present invention as defined in the accompanying claims. For example, the shape and dimensions of the male moulds 28 may be varied according to the particular requirements. The skilled person would also readily appreciate that there are many alternative ways to lay up the fibrous material 40, 68 on the male moulds 28.

The invention claimed is:

1. A method of making a prefabricated root section for a wind turbine blade, the method comprising:
    providing a male mould extending longitudinally in a spanwise direction between an inboard end and an outboard end and extending transversely in a chordwise direction between a leading edge and a trailing edge, the male mould defining a male mould surface of convex curvature in the chordwise direction;
    providing a root plate having one or more root inserts projecting therefrom, the or each root insert being arranged along an arcuate path;
    arranging one or more inner fibrous layers on the male mould surface;
    arranging the root plate at the inboard end of the male mould such that the or each root insert overlays an inner fibrous layer at the root end of the mould;
    arranging one or more outer fibrous layers on top of the inner fibrous layers and on top of the or each root insert;
    providing resin to the fibrous layers and to the or each root insert; and
    curing the resin to form the prefabricated root section for subsequent use in the manufacture of a wind turbine blade,
    wherein curing the resin to form the prefabricated root section is conducted before removing the prefabricated root section from the male mould.

2. The method of claim 1, wherein the step of curing the resin comprises arranging the male mould in an oven.

3. The method of claim 1, further comprising attaching the root plate to the male mould to fix the position of the root plate and the or each root insert relative to the male mould.

4. The method of claim 1, wherein after curing the resin the method further comprises removing the prefabricated root section from the male mould, turning the prefabricated root section through substantially 180 degrees around a horizontal axis, and supporting the prefabricated root section in a separate support frame.

5. The method of claim 1, wherein the number of fibrous layers arranged at the inboard end of the mould is more than the number of fibrous layers arranged at the outboard end such that the resulting prefabricated root section is thicker at its inboard end than at its outboard end.

6. A method of making a wind turbine blade, the method comprising:
    providing a female blade mould extending in a spanwise direction between first and second ends;
    arranging fibrous material in the blade mould;
    arranging a prefabricated root section prepared according to the method of claim 1 in or adjacent to the blade mould;
    providing resin to the fibrous material and between the fibrous material and the prefabricated root section; and
    curing the resin to form an outer shell portion of the blade integrated with the prefabricated root section.

7. The method of claim 6, wherein the prefabricated root section is arranged to form part of an outer surface of the blade after curing the resin.

8. The method of claim 6, wherein the prefabricated root section is arranged in a portion of the blade mould that is substantially unheated during curing of the resin.

9. The method of claim 6, comprising supporting the prefabricated root section in a support frame arranged adjacent to the first end of the blade mould.

10. The method of claim 9, wherein the blade mould is located inside a building and at least part of the support frame is arranged outside the building.

11. The method of claim 6, wherein the female mould or the support frame comprises a face plate at the first end, the face plate being provided with datum features, and wherein the method comprises aligning datum features of the root plate of the prefabricated root section with the datum features of the face plate.

* * * * *